ically-US009960988B2

(12) United States Patent
Gautreau et al.

(10) Patent No.: US 9,960,988 B2
(45) Date of Patent: *May 1, 2018

(54) SYSTEMS AND METHODS FOR REDUCING INFORMATION LOSS IN AN AGGREGATED INFORMATION HANDLING SYSTEM

(71) Applicant: DELL PRODUCTS L.P, Round Rock, TX (US)

(72) Inventors: Brian L. Gautreau, Round Rock, TX (US); Balaji R. Mittapalli, Cedar Park, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/096,476

(22) Filed: Apr. 12, 2016

(65) Prior Publication Data

US 2016/0269263 A1 Sep. 15, 2016

Related U.S. Application Data

(63) Continuation of application No. 13/730,520, filed on Dec. 28, 2012, now Pat. No. 9,325,608.

(51) Int. Cl.
*H04L 12/26* (2006.01)
*H04L 12/709* (2013.01)
(Continued)

(52) U.S. Cl.
CPC .......... *H04L 43/10* (2013.01); *H04L 45/245* (2013.01); *H04L 45/26* (2013.01); *H04L 49/00* (2013.01);
(Continued)

(58) Field of Classification Search
CPC ....... H04L 45/245; H04L 45/26; H04L 49/00; H04L 43/10; H04L 29/08; H04L 29/06; H04L 12/24
See application file for complete search history.

(56) References Cited

U.S. PATENT DOCUMENTS 7,912,091 B1 * 3/2011 Krishnan ............... H04L 45/02
370/490
2011/0228767 A1 * 9/2011 Singla .................... H04L 49/00
370/389

(Continued)

*Primary Examiner* — Ian N Moore
*Assistant Examiner* — Mewale Ambaye
(74) *Attorney, Agent, or Firm* — Haynes and Boone, LLP

(57) ABSTRACT

An information handling system is provided. The information handling system includes at least one server, that includes a plurality of ports, wherein information is transmitted to and from the at least one server on the plurality of ports, and a memory storing a table, the table storing a status indication and port on which the status indication was received. The information handling system also includes a plurality of switches coupled to the at least one server to form a link aggregation group (LAG), the plurality of switches transmitting information including the status indication to the at least one server. If the server receives more than one status indication having a master status, the at least one server is configured to stop forwarding information on at least one port on which information including a master status indication has been received after previously receiving information that did not include a master status indication.

17 Claims, 5 Drawing Sheets

(51) Int. Cl.
- *H04L 12/931* (2013.01)
- *H04L 12/721* (2013.01)
- *H04L 29/08* (2006.01)
- *H04L 29/06* (2006.01)

(52) U.S. Cl.
CPC .............. *H04L 29/06* (2013.01); *H04L 29/08* (2013.01); *Y02B 60/33* (2013.01); *Y02B 60/43* (2013.01)

(56) References Cited

U.S. PATENT DOCUMENTS

| | | | |
|---|---|---|---|
| 2012/0113835 A1* | 5/2012 | Alon | H04L 43/0817 370/252 |
| 2014/0025736 A1* | 1/2014 | Wang | H04L 45/46 709/204 |

\* cited by examiner

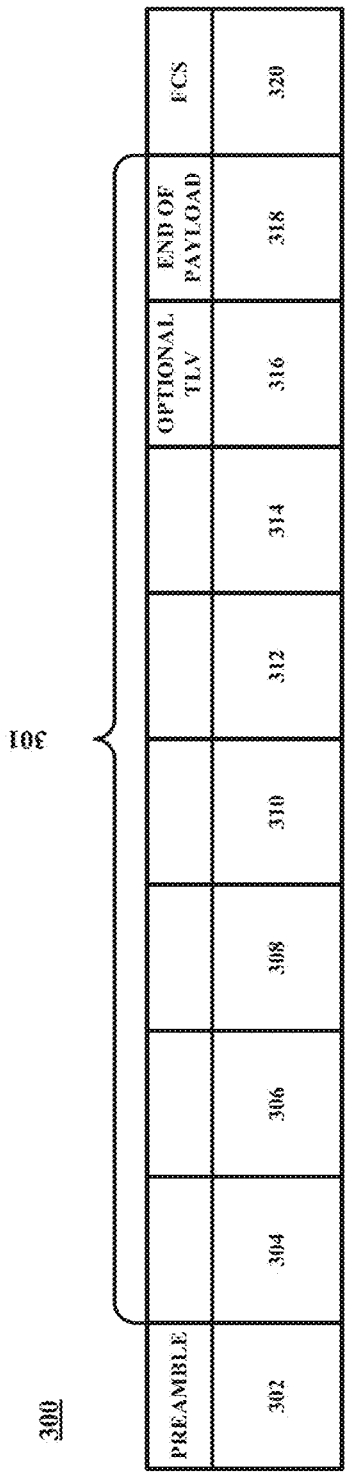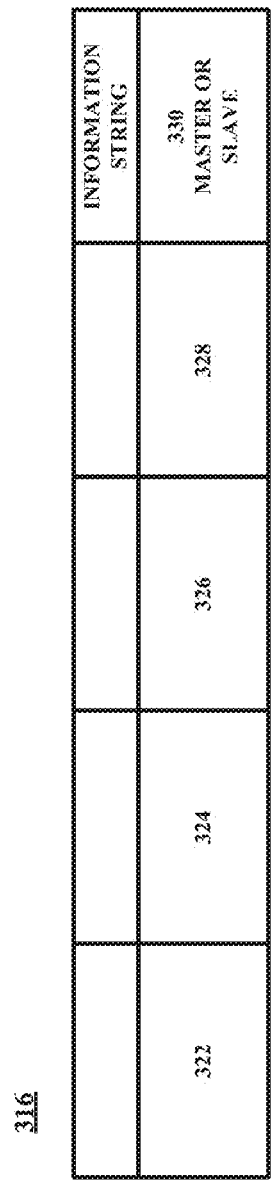
FIG. 3A
FIG. 3B

SYSTEMS AND METHODS FOR REDUCING INFORMATION LOSS IN AN AGGREGATED INFORMATION HANDLING SYSTEM

CROSS-REFERENCE TO RELATED APPLICATIONS

The present application is a continuation of U.S. patent application Ser. No. 13/730,520, filed on Dec. 28, 2012, now U.S. Pat. No. 9,450,881, which is herein incorporated by reference.

BACKGROUND

Technical Field

Embodiments disclosed herein are related to systems and methods for reducing information loss in an aggregated information handling system. In particular, systems and methods disclosed herein may provide for systems and methods that remove members from a link aggregation group to reduce information loss in the event of a link failure.

Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

However, in certain information handling systems that are aggregated, link failures can result in a loss of information. In aggregated information handling systems that utilize stacked switches, additional problems can arise after a link failure, as information may be routed to a switch that is no longer connected to the stack due to the link failure. What is needed are systems and methods for reducing information loss in an aggregated information system after a link failure.

BRIEF DESCRIPTION OF THE FIGURES

FIGS. 3A and 3B are diagrams illustrating packets including a master or slave status indication, consistent with some embodiments.

Figure 1:
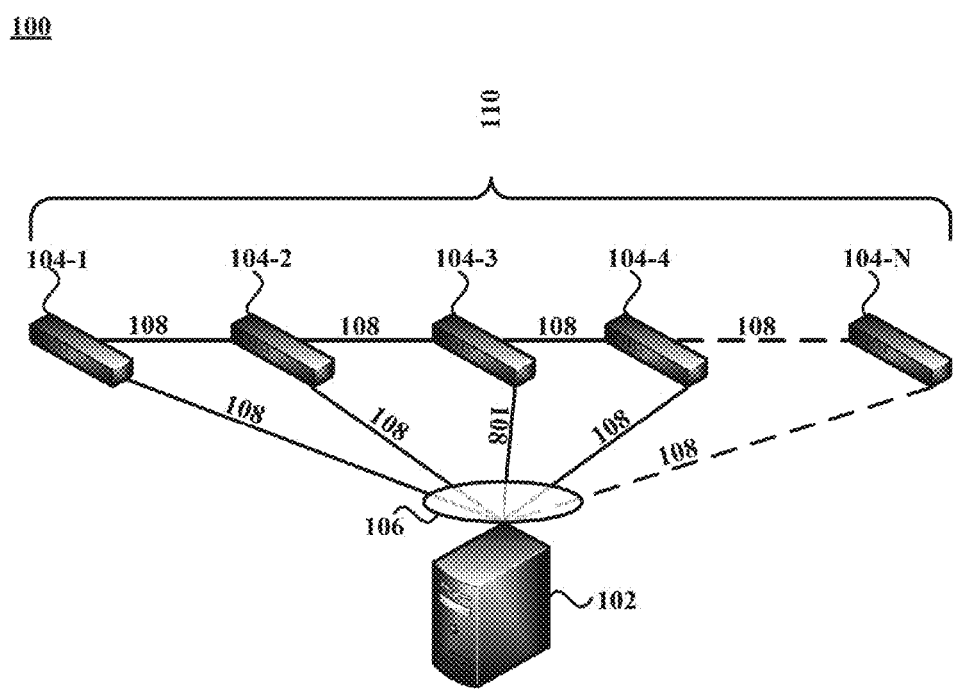
FIG. 1 is a diagram illustrating an information handling system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

Consistent with some embodiments, there is provided an information handling system. The information handling system includes at least one server, that includes a plurality of ports, wherein information is transmitted to and from the at least one server on the plurality of ports, and a memory storing a table, the table storing a status indication and port on which the status indication was received. The information handling system also includes a plurality of switches coupled to the at least one server to form a link aggregation group (LAG), the plurality of switches transmitting information including the status indication to the at least one server. If the server receives more than one status indication having a master status, the at least one server is configured to stop forwarding information on at least one port on which information including a master status indication has been received after previously receiving information that did not include a master status indication.

A method for maintaining a link aggregation group (LAG) is provided. The method includes transmitting, by switches that are members of the LAG, information including a status indication, receiving, by a server coupled to the switches, the transmitted information, storing, by the server, the status indication and a port on which the information including the status indication was received, and stopping, by the server, forwarding of information on a port on which information including a master status indication has been received after previously receiving information that did not include a master status indication if the server receives information from more than switch that includes a master status indication.

A non-transitory computer-readable medium is provided. The medium includes instructions for execution by one or more processors that, when executed, cause the one or more processors to perform a method for maintaining a link aggregation group (LAG). The method includes receiving transmitted information including a status indication, storing the status indication and a port on which the information including the status indication was received, and stopping forwarding of information on a port on which information including a master status indication has been received after previously receiving information that did not include a master status indication if more than one status indication has been received.

These and other embodiments will be described in further detail below with respect to the following figures.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a diagram illustrating an information handling system, consistent with some embodiments. As shown in FIG. 1, system 110 includes a server 102 coupled to N switches, 104-1-104-N (collectively referred to as switches 104). Consistent with some embodiments, switches 104 may be level two (L2) switches, level three (L3) switches, or a combination thereof (L2/L3). Further consistent with some embodiments, server 102 and switches 104 form a link aggregation group (LAG) 106. In some embodiments, LAG 106 may be a Institute of Electrical and Electronic (IEEE) standard 802.3ad compliant LAG, but in other embodiments, LAG 106 may conform to other standards. LAG combines a plurality of physical links, such as links 108 between server 102 and switches 104, into a single logical link (LAG 106) to increase the throughput beyond with a single connection can provide and to provide redundancy in case one link 108 fails. Moreover, LAG 106 may provide load balancing by distributing the processing and communications activity across links 108 so that no single link 108 is overwhelmed. As a result, LAG 106 may provide higher link availability and increased link capacity.

Consistent with some embodiments, switches 104 may be stacked switches. A switch stack is a group of switches that have been set up to operate together such that they show the characteristics of a single switch, but have the port capacity of the sum of the combined switches. The switch stack may share a single internet protocol (IP) address for remote administration of the stack. Moreover, to form a LAG, all of the switches in a stack may share the same bridge id so that it appears to a server that all of the ports in a LAG are connected to the same switch. In such an arrangement, stacked switches in a LAG may be indicated as being either a master switch or a slave switch, with one switch being the master switch and the remaining switches being slave switches. A switch stack may also be referred to as an Ethernet fabric.

Returning to FIG. 1, switches 104 may be a switch stack 110, with switch 104-1 being the master switch and switches 104-2-104-N being slave switches. Switches 104 may have multiple ports that may be aggregated in LAG 106. Moreover, server 102 and switches 104 may include any appropriate combination of hardware and/or software having a processor and capable of reading instructions stored on a non-transitory machine-readable medium for execution by the processor. Consistent with some embodiments, server 102 and switches 104 include a machine-readable medium, such as a memory (not shown) that includes instructions for execution by one or more processors (not shown) for causing server and switches 104 to perform specific tasks. For example, such instructions may include handling and routing information, forming a LAG, and maintaining a LAG. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
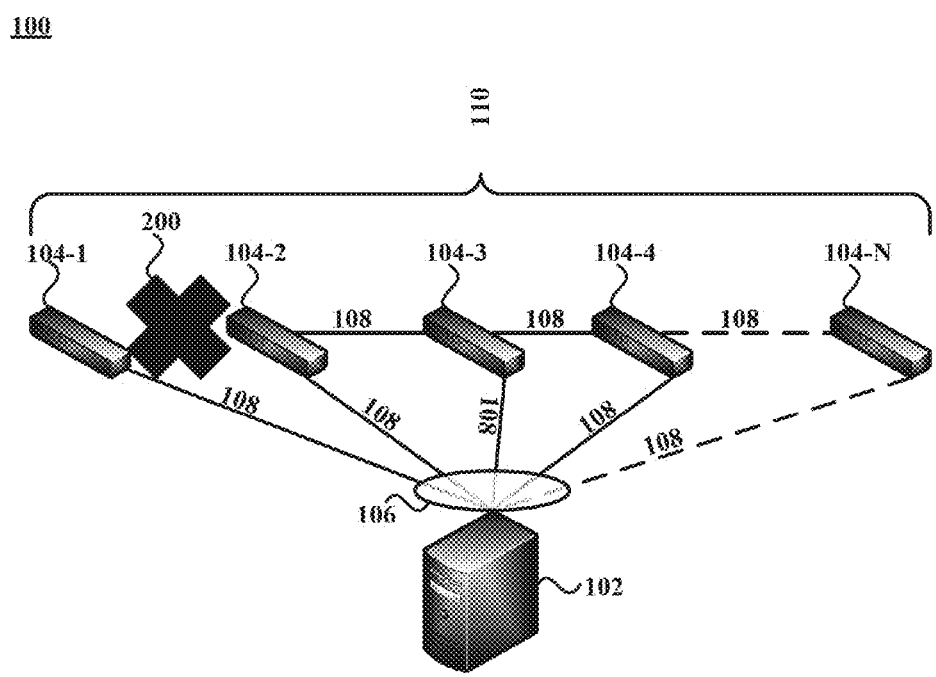
FIG. 2 is a diagram illustrating an information handling system having a broken or failed link, consistent with some embodiments.

FIG. 2 is a diagram illustrating an information handling system having a broken or failed link, consistent with some embodiments. As shown in FIG. 2, system 100 has a failed or broken link 200 between switch 104-1 (master) and switch 104-2 (slave). As a result of the failure, switches 104-2-104-N of stack 110 will be disconnected from master switch 104-1, while all switches 104 remain coupled to server 102. In order to maintain LAG 106 and stack 110 after link between master switch 104-1 and switch 104-2 fails, at least one of remaining switches 104-2-104-N may have a master switch status indication. This results in a "split-brain" situation, where switch stack 110 has multiple masters, including switch 104-1, which is disconnected from stack 110 but still coupled to server 102, and at least one of remaining switches 104-2-104-N. As a result, server 102, not knowing that there has been a failure, will continue to route information over links 108 to switches 104 for forwarding, including switch 104-1. However, information transmitted to switch 104-1 then be sent to destinations that it can no longer access due to the failure, which will result in transmission failure, or dropped packets. Similarly, and information transmitted to any of switches 104-2-104-N that is to be forwarded to switch 104-1 will also not be able to reach its intended destination due to the failure.

FIGS. 3A and 3B are diagrams illustrating packets including a master or slave status indication, consistent with some embodiments. To reduce the transmission failure and dropped packets that may occur following a link failure in a switch stack that is part of a LAG, switches 104 may periodically transmit information to server 104 that provides a status indication as to whether the switch 104 transmitting the information is a master switch of the stack or a slave switch of stack 110. Consistent with some embodiments, the periodicity of the transmission of this information may be between about 1 second and 30 seconds. Server 106, or other device on the end of the LAG, may receive this information, and store the received status indication along with a port (identifying the corresponding switch) on which the information has been received in a table in a memory. If server 106 receives multiple status indications indicating that more than one switch 104 is a master, one or more processors of server 106 may then check to see which ports previously received a master status indication and a slave indication. Server 106 may then stop forwarding information on ports wherein a slave status indication had been previously received, and only forward information on ports associated with the first master switch (i.e., switch 104-1) to prevent information loss until broken link 200 is repaired.

As shown in FIG. 3A, packet 300 includes fields 302-320. Consistent with some embodiments, packet 300 may be a link layer discovery protocol (LLDP) packet. Field 300 may be a preamble field, and fields 304-318 may be a payload 301. Fields 304-312 may include information, such as a destination media access controller (MAC) address, a source MAC address, an ethertype that indicates which protocol is encapsulated in a payload of packet 300, a chassis identification (ID) type-length-value (TLV) identifying a chassis where the originating switch 104 resides, a port ID TLV identifying the port on which packet is transmitted, a time-to-live TLV, and other optional TLVs, which are shown in FIG. 3B. Field 318 may include an end of payload TLV, and field 320 may include a frame check sequence (FCS) for error detection. As shown in FIG. 3B, optional TLVs 322-330 in field 316 may include information TLVs, such as a type, a length, an identifier, a subtype, and an information string. Consistent with some embodiments, optional TLVs 322-330 in field 316 may include a status indication as to whether the switch 104 from which packet 300 originates is a master switch in stack 110 or a slave switch in stack 110. In other embodiments, optional TLVs 322-330 in field 316 may also include a status indication as to whether the switch 104 from which packet 300 originates is a master or slave switch in stack 110, but also what switch 104 in stack 110 is the master that any slave switches are slaves to.

In operation, switches 104 organized as a stack 110 and coupled to server 102 over links 108 to form LAG 106, have a status of either being a master switch in stack 110 or a slave switch in stack 110, and write an indication of this status in optional TLVs 316 of packet 300. Packet 300 is transmitted from each switch 104 to server 102. Server 102 receives packet 300 on a port associated with a particular switch 104, determines the status of the transmitting switch, and then stores the status indication in optional TLVs 316 along with an associated port on which packet 300 was received in a memory, perhaps in a table in the memory. When server 102 stores the status indication, it will also check to see if it has stored two consecutive master status indications from two or more switches, and if more than one master status indication us seen by server 102, server 102 will check the previous entry on that port to see if the previous entry included a master or slave indication. If server 102 determines that any of the multiple master status indications included a slave indication on a previous entry, server 102 will determine that there has been a link failure, and stop forwarding information on the port associated with the current master status indication that had a previous slave status indication. Consistent with some embodiments, optional TLV 316 may also include a status indication as to whether the switch 104 from which packet 300 originates is a master or slave switch in stack 110, but also what switch 104 in stack 110 is the master that any slave switches are slaves to. In such embodiments, when server 102 sees more than one master status indication, server will stop forwarding stop forwarding information on the port associated with the current master status indication that had a previous slave status indication and any other ports that have also indicated that the port associated with the current master status indication that had a previous slave status indication is the master.

Figure 4:
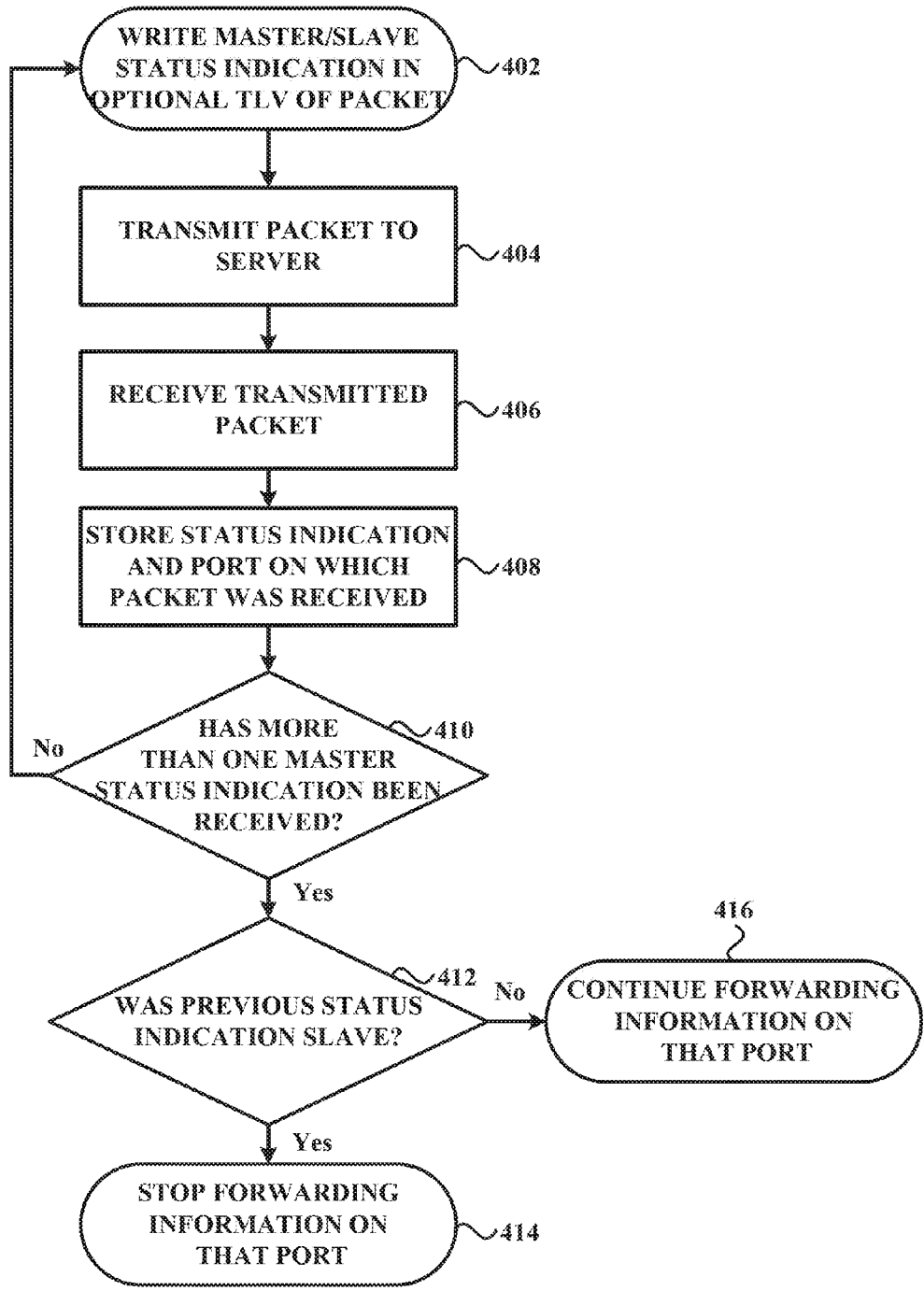
FIG. 4 is a flowchart illustrating a method for maintaining a link aggregation group (LAG) in an information handling system, consistent with some embodiments.

FIG. 4 is a flowchart illustrating a method for maintaining a link aggregation group (LAG) in an information handling system, consistent with some embodiments. For the purpose of discussion, the method shown in FIG. 4 will be discussed with reference to FIGS. 1-3. Consistent with some embodiments, the method shown in FIG. 4 may be embodied in a non-transient computer-readable medium stored in a memory of server 102 and/or switches 104 that, when executed by one or more processors of server 102 and/or switches 104 cause system 100 to perform the method in FIG. 4. As shown in FIG. 4, a master or slave status indication is written in an optional TLV frame 316 of packet 300 by switches 104 (402). Packet 300 may be a LLDP packet, and the master or slave status indication may include a further indication as to which switch 104 the switch writing the master/slave indication is a slave to if it is a slave switch. Switch 104 then transmits packet 300 to server 102 over link 108 (404). Server 102 receives the transmitted packet 300 (406) and stores in a memory the master or slave status indication in the optional TLV frame 316 of packet 300 along with an associated port on which packet 300 was received (408). Consistent with some embodiments, the status indication and the associated port may be stored in a table in a memory of server 102. Further consistent with some embodiments, server 102 may also store the further indication as to which switch 104 the switch that transmitted packet 300 is a slave to, if such a further indication is included in packet 300.

Returning to FIG. 4, switches 104 will periodically send packet 300, and server will determine if more than one master status indication has been received (410). Consistent with some embodiments, receiving more than one master status indication may demonstrate that multiple switches 104 believe that they are a master switch, possibly indicative of a link 108 failure. If server 102 does not find multiple master switches, server 102 will continue to check for multiple master status indications as switches 104 periodically transmit packet 300 to server 102. If server 102 determines that more than one master status indication has been received, server 102 will determine if any of the switches 104 that transmitted packet 300 with a master status indication had previously transmitted packet 300 with a slave status indication (412). As noted above, server 102 may store the master or slave status indication along with the port that packet including the indication is received on. The status indication and the associated port may be stored as entries in a table. Server 102 may review the entries in the table to determine if the previous entry for that port included a slave indication. If server 102 determines that a switch 104 transmitting packet 300 with a master status indication previously transmitted packet 300 having a slave status indication, upon receiving multiple master status indications, server 102 will stop forwarding information on the port on which the master status indication was received (414). By stopping the forwarding of information on that port, server 102 may avoid losing information that may be sent over broken link 200. Moreover, one or more members of the LAG are essentially removed, decreasing the throughput and increasing the load on the remaining members of the LAG, but information loss will be eliminated or at least reduced. Further, if packet 300 includes a further indication as to which switch 104 the transmitting switch is a slave to, and that switch 104 has been removed from the LAG by server 102 stopping the transmission of information over a port associated with that switch 104, server 102 may also stop forwarding information over all of the ports that are associated with switches 104 that indicate that they are slave to the switch 104 that was removed from the LAG. If server 102 determines that a switch 104 transmitting packet 300 with a master status indication previously transmitted packet 300 having also having a master status indication, upon receiving multiple master status indications, server 102 will continue forwarding information on the port on which the master status indication was received, as the switch 104 from which this packet 300 will be determined to be the correct master switch 104 of switch stack 110 (416).

Figure 5:
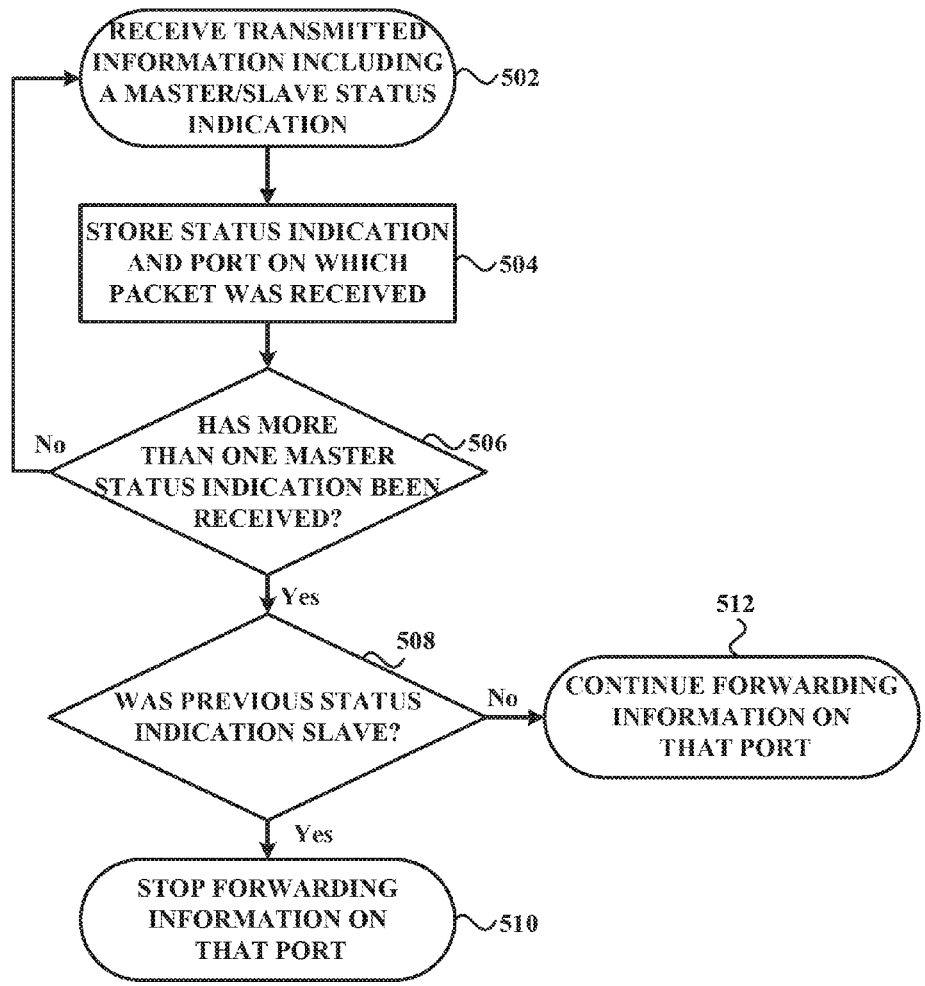
FIG. 5 is a flowchart illustrating a method for maintaining a link aggregation group (LAG) in an information handling system, consistent with some embodiments.

FIG. 5 is a flowchart illustrating a method for maintaining a link aggregation group (LAG) in an information handling system, consistent with some embodiments. For the purpose of discussion, the method shown in FIG. 5 will be discussed with reference to FIGS. 1-3. Consistent with some embodiments, the method shown in FIG. 4 may be embodied in a non-transient computer-readable medium stored in a memory of server 102 that, when executed by one or more processors of server 102 cause server 102 to perform the method in FIG. 5. As shown in FIG. 5, server 102 receives transmitted information including a master/slave indication (502). The information may be packet 300 which may be a LLDP packet, and the master or slave status indication may include a further indication as to which switch 104 the switch writing the master/slave indication is a slave to if it is a slave switch. Server 102 stores in a memory the master or slave status indication in the optional TLV frame 316 of packet 300 along with an associated port on which packet 300 was received (504). Consistent with some embodiments, the status indication and the associated port may be stored in a table in a memory of server 102. Further consistent with some embodiments, server 102 may also store the further indication as to which switch 104 the switch that transmitted packet 300 is a slave to, if such a further indication is included in packet 300. As server 102 receives packets 300, server 102 will determine if more than one master status indication has been received (506). Consistent with some embodiments, receiving more than one master status indication may demonstrate that multiple switches 104 believe that they are a master switch, possibly indicative of a link 108 failure. If server 102 does not find multiple master switches, server 102 will continue to check for multiple master status indications as switches 104 periodically transmit packet 300 to server 102. If server 102 determines that more than one master status indication has been received, server 102 will determine if any of the switches 104 that transmitted packet 300 with a master status indication had previously transmitted packet 300 with a slave status indication (508). As noted above, server 102 may store the master or slave status indication along with the port that packet including the indication is received on. The status indication and the associated port may be stored as entries in a table. Server 102 may review the entries in the table to determine if the previous entry for that port included a slave indication. If server 102 determines that a switch 104 transmitting packet 300 with a master status indication previously transmitted packet 300 having a slave status indication, upon receiving multiple master status indications, server 102 will stop forwarding information on the port on which the master status indication was received (510). By stopping the forwarding of information on that port, server 102 may avoid losing information that may be sent over broken link 200. Moreover, one or more members of the LAG are essentially removed, decreasing the throughput and increasing the load on the remaining members of the LAG, but information loss will be eliminated or at least reduced. Further, if packet 300 includes a further indication as to which switch 104 the transmitting switch is a slave to, and that switch 104 has been removed from the LAG by server 102 stopping the transmission of information over a port associated with that switch 104, server 102 may also stop forwarding information over all of the ports that are associated with switches 104 that indicate that they are slave to the switch 104 that was removed from the LAG. If server 102 determines that a switch 104 transmitting packet 300 with a master status indication previously transmitted packet 300 having also having a master status indication, upon receiving multiple master status indications, server 102 will continue forwarding information on the port on which the master status indication was received, as the switch 104 from which this packet 300 will be determined to be the correct master switch 104 of switch stack 110 (512).

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A network device comprising:
   a plurality of ports, each of the plurality of ports coupling the network device to one of a plurality of switches arranged in a stacked switch configuration, the plurality of ports being configured to form a link aggregation group (LAG);
   one or more processors coupled to the plurality of ports, the one or more processors being configured to execute instructions that cause the network device to perform a method comprising:
   receiving a first status indication on a first port of the plurality of ports, the first port directly coupling a first switch of the plurality of switches to the network device;
   receiving a second status indication on the first port previous to receiving the first status indication; and
   stopping forwarding of information on the first port when the first status indication includes a master status indication for the first switch and the second status indication includes a slave status indication for the first switch.

2. The network device of claim 1, wherein the method further comprises stopping forwarding of information on the first port when the first status indication includes the master status indication for the first switch, a third status indication previously received on a second port of the plurality of ports includes a master status indication for a second switch of the plurality of switches directly coupled to the network device by the second port, and the first switch and the second switch are different.

3. The network device of claim 1, wherein the method further comprises stopping forwarding of information on the first port when the first status indication includes a slave status indication for the first switch, the first status indication identifies a second switch of the plurality of switches as a master switch of the stacked switch configuration, a third status indication previously received on a second port of the plurality of ports includes a master status indication for a third switch of the plurality of switches directly coupled to the network device by the second port, and the second switch and the third switch are different.

4. The network device of claim 1, wherein the first status indication is included in a link layer discovery protocol (LLDP) packet.

5. The network device of claim 1, wherein the method further comprises saving the first status indication and information identifying the first port in a table.

6. The network device of claim 1, wherein the network device is a server.

7. A method comprising:
receiving, by a network device, a first status indication on a first port of a plurality of ports coupling the network device to a plurality of switches in a stacked switch configuration, a first switch of the plurality of switches being directly coupled to the network device using the first port, the plurality of ports being configured to form a link aggregation group (LAG);
receiving, by the network device, a second status indication on the first port; and
stopping, by the network device, forwarding of information on the first port when the first status indication includes a master status indication for the first switch and the second status indication includes a slave status indication for the first switch.

8. The method of claim 7, further comprising stopping, by the network device, forwarding of information on the first port when the first status indication includes a master status indication for the first switch, a third status indication previously received on a second port of the plurality of ports includes a master status indication for a second switch of the plurality of switches directly coupled to the network device by the second port, and the first switch and the second switch are different.

9. The method of claim 7, further comprising stopping, by the network device, forwarding of information on the first port when the first status indication includes a slave status indication for the first switch, the first status indication identifies a second switch of the plurality of switches as a master switch of the stacked switch configuration, a third status indication previously received on a second port of the plurality of ports includes a master status indication for a third switch of the plurality of switches directly coupled to the network device by the second port, and the second switch and the third switch are different.

10. The method of claim 7, wherein the first status indication is included in a link layer discovery protocol (LLDP) packet.

11. The method of claim 7, further comprising saving the first status indication and information identifying the first port in a table.

12. A non-transitory computer-readable medium having instructions for execution by one or more processors associated with a network device that, when executed, cause the network device to perform a method comprising:
receiving a first status indication on a first port of a plurality of ports coupling the network device to a plurality of switches in a stacked switch configuration, a first switch of the plurality of switches being directly coupled to the network device using the first port, the plurality of ports being configured to form a link aggregation group (LAG);
receiving, by the network device, a second status indication on the first port; and
stopping forwarding of information on the first port when the first status indication includes a master status indication for the first switch and the second status indication includes a slave status indication for the first switch.

13. The non-transitory computer-readable medium of claim 12, wherein the method further comprises stopping forwarding of information on the first port when the first status indication includes a master status indication for the first switch, a third status indication previously received on a second port of the plurality of ports includes a master status indication for a second switch of the plurality of switches directly coupled to the network device by the second port, and the first switch and the second switch are different.

14. The non-transitory computer-readable medium of claim 12, wherein the method further comprises stopping forwarding of information on the first port when the first status indication includes a slave status indication for the first switch, the first status indication identifies a second switch of the plurality of switches as a master switch of the stacked switch configuration, a third status indication previously received on a second port of the plurality of ports includes a master status indication for a third switch of the plurality of switches directly coupled to the network device by the second port, and the second switch and the third switch are different.

15. The non-transitory computer-readable medium of claim 12, wherein the first status indication is included in a link layer discovery protocol (LLDP) packet.

16. The non-transitory computer-readable medium of claim 12, wherein the method further comprises saving the first status indication and information identifying the first port in a table.

17. The non-transitory computer-readable medium of claim 12, wherein the network device is a server.

* * * * *